United States Patent [19]
Chen et al.

[11] B 3,981,690
[45] Sept. 21, 1976

[54] AGGLOMERATING COMBUSTOR-GASIFIER METHOD AND APPARATUS FOR COAL GASIFICATION

[75] Inventors: Joseph L. P. Chen, Murrysville; David H. Archer, Pittsburgh, both of Pa.

[73] Assignee: The United States of America as represented by the United States Energy Research and Development Administration, Washington, D.C.

[22] Filed: Jan. 15, 1975

[21] Appl. No.: 541,376

[44] Published under the second Trial Voluntary Protest Program on February 17, 1976 as document No. B 541,376.

[52] U.S. Cl. .......................................... 48/73; 48/63; 48/76; 48/203; 48/206; 48/DIG. 4; 110/28 J; 110/28 V; 201/31
[51] Int. Cl.² .............................................. C10J 3/20
[58] Field of Search ............ 48/76, 73, 63, 77, 202, 48/203, 197 R, 210, 206, DIG. 4; 201/31; 110/28 J, 28 V; 132/4 D; 34/57 A

[56] References Cited
UNITED STATES PATENTS
3,772,999  11/1973  Miller, Jr. et al. ................. 110/28 J
3,847,563  11/1974  Archer et al. ........................ 48/202

*Primary Examiner*—S. Leon Bashore
*Assistant Examiner*—George C. Yeung
*Attorney, Agent, or Firm*—Dean E. Carlson

[57] ABSTRACT

A method and apparatus for gasifying coal wherein the gasification takes place in a spout fluid bed at a pressure of about 10 to 30 atmospheres and a temperature of about 1800° to 2200°F and wherein the configuration of the apparatus and the manner of introduction of gases for combustion and fluidization is such that agglomerated ash can be withdrawn from the bottom of the apparatus and gas containing very low dust loading is produced. The gasification reaction is self-sustaining through the burning of a stoichiometric amount of coal with air in the lower part of the apparatus to form the spout within the fluid bed. The method and apparatus are particularly suitable for gasifying coarse coal particles.

11 Claims, 4 Drawing Figures

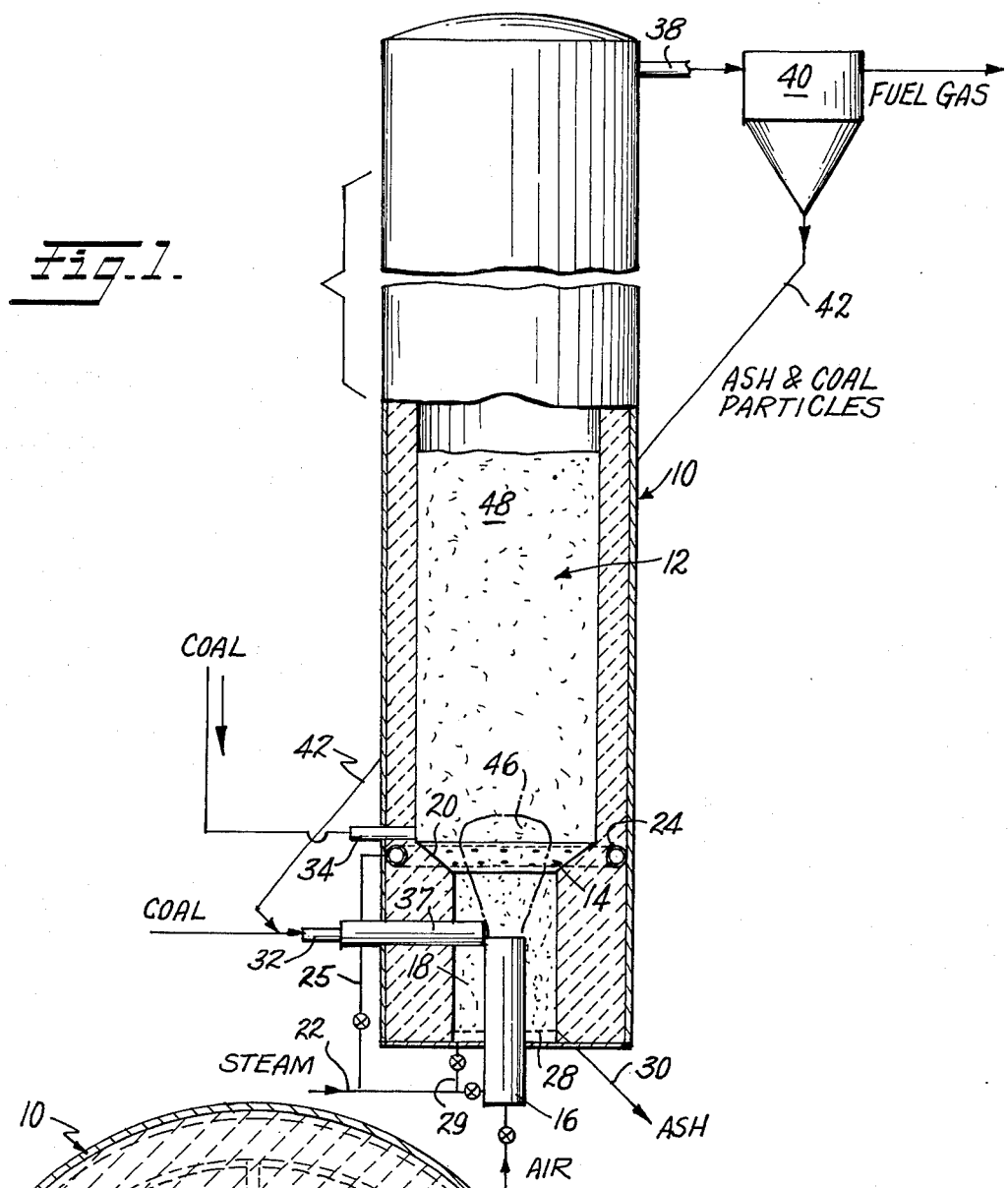
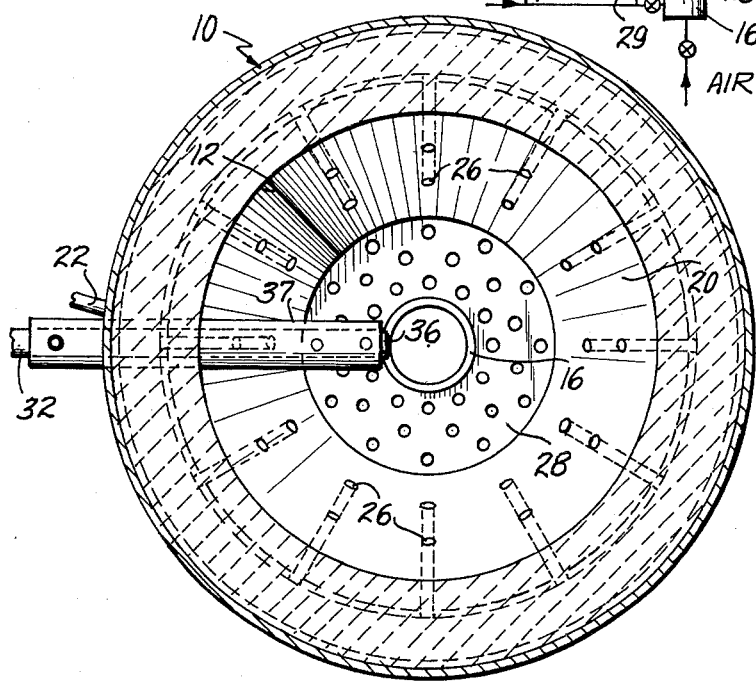

AGGLOMERATING COMBUSTOR-GASIFIER METHOD AND APPARATUS FOR COAL GASIFICATION

BACKGROUND OF THE INVENTION

In an application of fluidized-bed technology to gasify coal fines, the dust carried over from the gasification bed usually contains a high percentage of carbon. The carbon in the dust cannot be consumed simply by returning the fines to the bed because of the tendency for them to blow out again. The carbon fines will then have to be burned to recover the energy. Removal of ash has also been a problem.

Burning carbon in a fluidized bed above 1920°F was first studied by Godel, "Ten Years of Experience in the Technique of Burning Coal in a Fluidized Bed", Revue Generale de Thermique 5, 348–358 (1966). He found that the ash of substantially all coals was self-adhering at these temperatures, no matter how much higher the ash-softening temperature was. Goldberger, "Collection of Fly Ash in a Self-Agglomerating Fluidized-Bed Coal Burner", ASME Winter Annular Meeting and Energy Systems Exposition, Pittsburgh, Pa., Nov. 12–17, 1967, experimented with a fluidized-bed coal burner operating in a temperature range of 1900° to 2050°F. He found that collection of fly ash and agglomeration and growth of the bed particles starts at a temperature as low as 1400°F. The ash collection rate increased rapidly as temperature exceeded 1900°F, but above 2100°F the sticking tendency of the bed was too great for stable fluidization. The coal burner system, which included the fluidized-bed coal burner and an external cyclone, was able to remove up to 99 percent of the ash fed and produced hot gases with low dust loading.

In U.S. Pat. No. 2,906,608, Jequier et al. described an apparatus for dense-phase fluidization of solid particles. The apparatus consisted of a fluidized chamber at the top and a conical duct in between the chamber and a venturi. As it was applied to gasify coal fines, a high gas velocity prevailed at the venturi to allow small balls of agglomerated ashes to pass through venturi but to prevent the falling of the coal fines. Rapid circulation and numerous collision of particles in the bed resulted in agglomerations of the fine ash particles when they were partially fused and sticky. These ash particles were discharged as they grew to a size big enough to fall downward against the current of gas through the venturi throat. A largescale test of the apparatus was performed at Centre d'Etudes et Recherches des Charbonnages de France. In a test period of less than 24 hours, their results did not show a smooth separation of agglomerated ash from coal fines, presumably owing to the surging of particles in the fluid bed and non-uniform movement of particles near the venturi. This was probably the reason that they had to increase the gas velocity at the throat to keep coal fines from falling as the height of the bed increased.

Both the British Gas Council, in U.S. Pat. No. 3,322,521, and the Consolidation Coal Co., "Bench-Scale Research on CSG Process", Report No. 16, Consolidation Coal Company to Office of Coal Research, July 1964 to June 1968, have reported that a good separation of two different solid particles with appreciable density difference could be achieved in a fluidized bed by properly choosing the gas velocity. The separation was quite stable and the efficiency was very high.

SUMMARY OF THE INVENTION

This invention provides an improved method and apparatus for coal gasification applying the general concept of ash agglomeration and low velocity char-ash separation of the background art discussed above. The invention comprises maintaining a fluidized bed in a gasification chamber of a vertically disposed, refractory-lined, pressure vessel above a combustion chamber of reduced cross-section. Carbonaceous solids are fed to the bed for gasification and product gas is withdrawn from the vessel above the bed. Reactive gas, e.g. air, is fed in the form of a high velocity jet through a central tube which extends upwardly through the bottom of the vessel. Carbonaceous material in approximately the stoichiometric amount for complete combustion with the air is introduced into the air stream at the top of the tube and is substantially completely burned to provide heat for the gasification reaction. Combustion takes place in the center of the chamber substantially out of contact with the chamber walls thereby minimizing slagging on the walls. Agglomerated ash descends in an annulus around the jet and around the central tube and steam or other gas which does not react exothermically with the carbon is introduced in a low velocity stream countercurrent to the descending ash particles to cool the agglomerates and strip off the carbon. The cooled agglomerated ash is withdrawn from the vessel. A high velocity jet at the center and low velocity gas in the annulus creates a high solid mixing in the gasifier and the apparatus is best described as a spout-fluid bed combustor-gasifier. The combined fluidizing and spouting bed offers many advantages, including:
- prevention of slagging at the wall by limiting the combustor region to the center of the bed;
- better separation of agglomerated ash from coal;
- more stable operation than a single spouting bed;
- no stratification in the bed even if the bed consists of particles of different size and density;
- increase in the solid-gas reaction rate;
- provision of a larger range of operable fluid flow rate;
- provision of a wider range of operable bed depth to diameter ratio;
- lower pressure drop as compared to a single spouting bed and hence a high operable bed depth; and
- better solid particle circulation and heat transfer in the bed.

The apparatus and method of operation are particularly suitable for coarse coal particles which require high heat and mass transfer rate.

DETAILED DESCRIPTION OF THE INVENTION

The invention will be more clearly understood from the following description of a preferred embodiment wherein reference is made to the accompanying engine;

FIG. 1 is a diagrammatic elevational view, partially in cross-section, of a pressure vessel for gasification of carbonaceous solids in accordance with this invention.

FIG. 3 is a cross-sectional view taken on the lines 3—3 of FIG. 2.

DESCRIPTION OF THE APPARATUS

Figure 2:
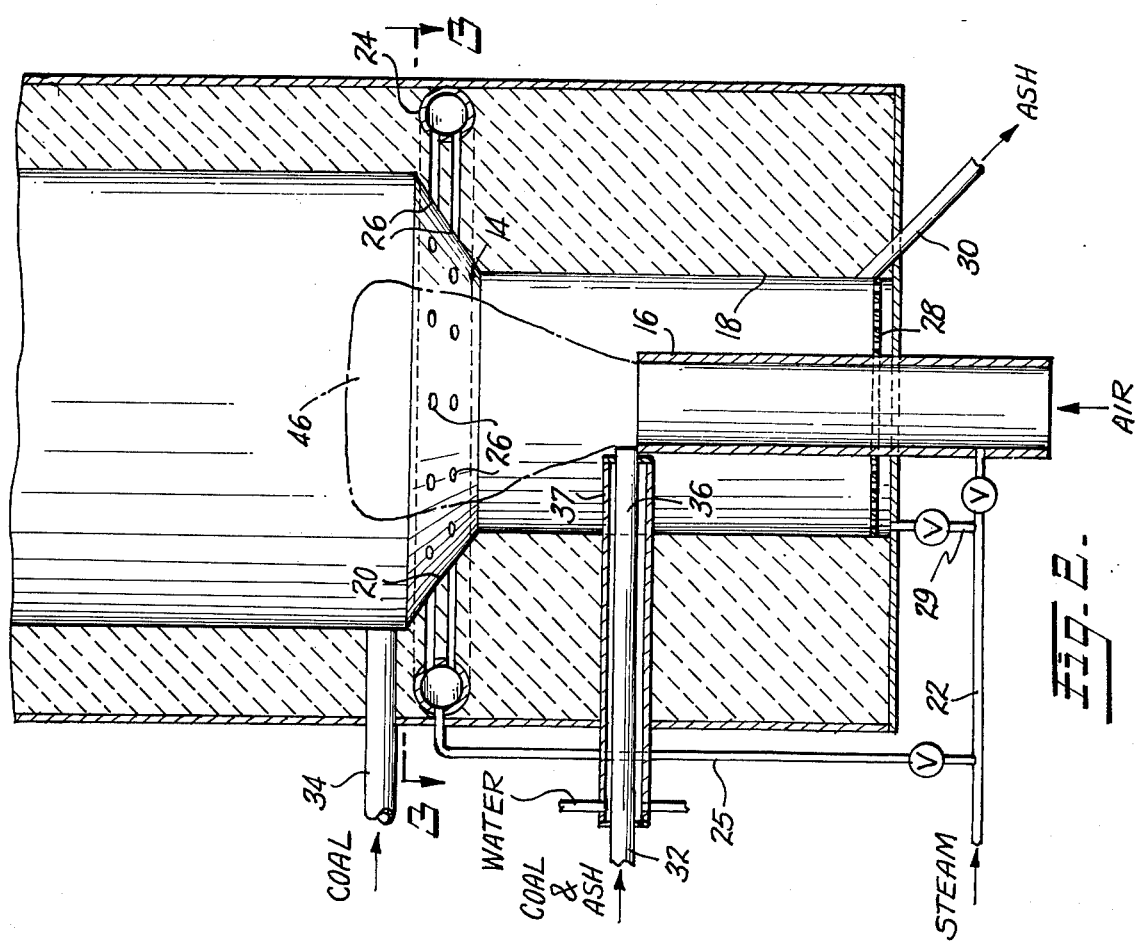
FIG. 2 is an enlarged fragmentary view of the bottom part of the apparatus shown in FIG. 1.

As shown in FIGS. 1 through 3, the apparatus comprises a cylindrical, refractory-lined, pressure vessel 10 which houses a gasification chamber 12, a combustion chamber 14, and a central axial-inlet tube 16. The annulus between the central tube 16 and the lower part of the refractory wall forms a coal ash separator 18. A slightly inclined refractory surface 20 is provided to connect the gasification chamber 12 and the combustion chamber 14.

Air or other oxygen-containing gas under appropriate pressure is fed to the combustion chamber 14 through the central tube 16. Steam or other fluidizing and/or stripping gas under appropriate pressure is introduced into the gasification chamber 12, the coal-ash separator 18 and the air feed tube 16 by pipe 22.

A circulatory pipe 24 is installed in the refractory lining and is attached to the pressure shell of vessel 10 at the intersection of the combustion chamber 14 and the gasification chamber 12. Pipe 22 is connected to the circular pipe 24 by means of branch pipe 25. Two rows of holes 26 are drilled horizontally through the refractory lining in such a manner that steam, or other gases, may be brought into the gasification chamber 12 to fluidize the annulus above the inclined surface 20. FIG. 3 shows the distribution of steam, or other gas, into the gasification chamber through the inclined surface 20.

A perforated distributor plate 28 is installed at the bottom of the coal-ash separator 18 to provide a smooth fluidization of the annulus surrounding central tube 16 and above. Agglomerated ash particles separated from coal fines are removed from the ash separator at a point above the distributor plate 28 through withdrawal line 30. Steam is introduced below the distributor plate 28 by means of branch line 29 connected to steam line 22.

Lines 32 and 34 are provided to feed coal into the combustion chamber and the gasification chamber, respectively. The coal is fed under pressure by feed means well known in the art. Coal feed line 32 extends from the side of the combustion chamber to the mouth of the central tube 16. The section of pipe 36 exposed to the hot solids and gas in the combustion zone may be water cooled at 37 as shown. Coal feed line 34 brings the coal to the gasification zone at a point near the bottom of the gasification chamber to allow the input coal to have sufficient residence time in the gasification chamber. Refractory materials are used to shape the chambers as shown in the drawings. The whole unit is designed to operate at high temperature and pressure, (10 to 30 atmosphers and 1800° to 2200°F).

The pressure vessel 10 is provided with an outlet 38 for product gases. These gases may be directed to solid separation means 40 for removal of any ash and coal particles which have approximately elutriated from the fluidized bed in the gasification chamber. This material can be transported under pressure by line 42 to inlet 32 for supplying at least part of the fuel for the combustion chamber 14.

Figure 4:
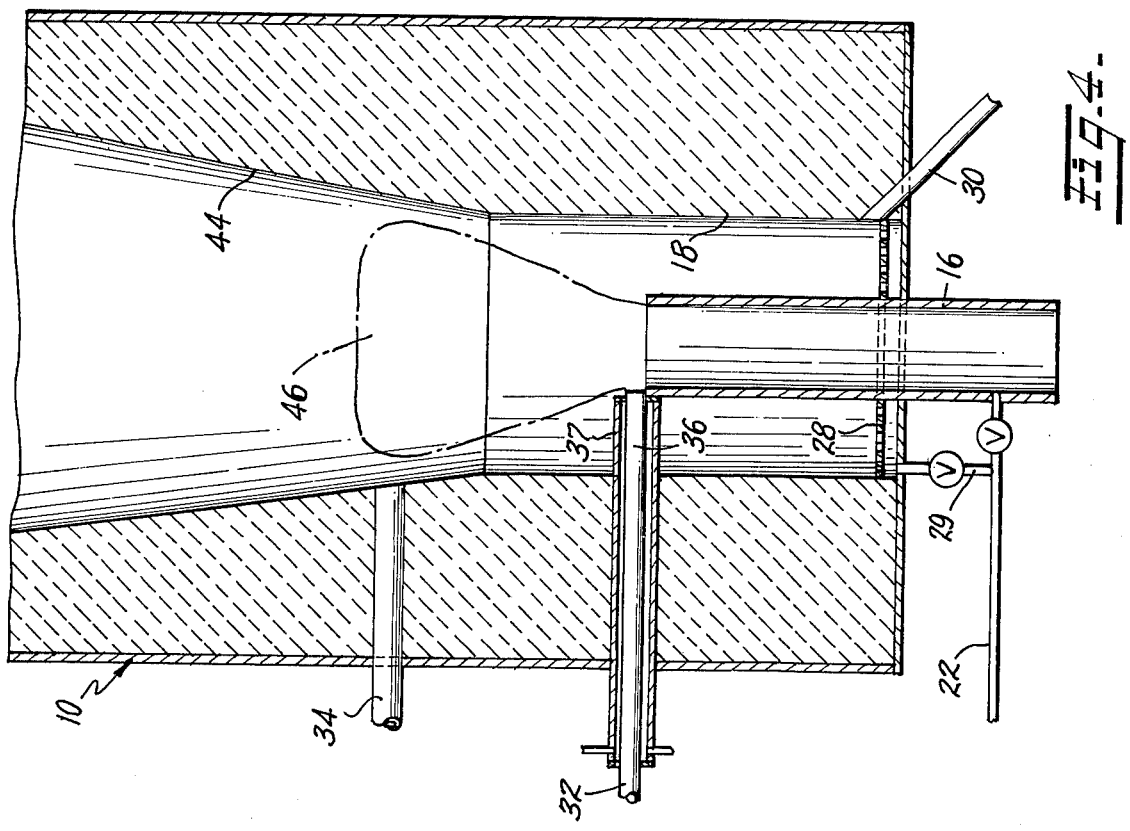
FIG. 4 is an enlarged fragmentary view of the bottom part of a modified form of the apparatus shown in FIG. 1.

FIG. 4 shows a modification of the bottom portion of the pressure vessel 10 wherein the refractory lining is given a conical configuration 44 which is tapered upwardly from the combustion chamber to the gasification chamber as shown. In this modification the inclined surface 20 and steam line to fluidize the annulus is eliminated. All other parts of the apparatus are the same as shown in FIGS. 1 and 2.

OPERATION OF THE APPARATUS

Compressed air or other oxygen containing gas at a pressure of about 10 to 30 atmospheres is fed to the central tube 16 where it meets a stoichiometric amount of coal or char brought in through the coal feed line 32 to form a hot carbon burning zone or spout 46. The coal is essentially burned out completely in this zone to leave a bed in the combustion chamber which is mainly ash. The temperature of the ash bed is kept in the range of 1900° to 2200°F. The coal fed into the combustion chamber through line 32 may be a mixture of ash and coal fines elutriated from the overlying fluidized gasifier bed 48 and separated from the product gases. If this is an insufficient amount, it is supplemented by fresh coal. The air entering through central tube 16 is given a velocity of 15 to 80 feet per second, measured at the mouth of the tube, and creates an internal spout 46 without breaking through the top of the overlying bed 48. The spout 46 penetrates from the combustion chamber to the gasifier chamber without blocking the cross-sectional area of the combustion chamber such that a solid circulation between the combustion chamber 14 and the gasification chamber 12 is promoted. The solid circulation transfers heat from the combustion zone to the gasifier zone to maintain the gasification reaction, which is endothermic, at a rapid rate and to keep the ash bed in the combustion zone from overheating and slagging. Steam may be introduced into the central tube 16 through line 22 as necessary to adjust the temperature of the ash bed. Hot ash particles in this region agglomerate to form larger particles which are ejected to the gasification chamber, cooled down in the bed 48 and then fall back to the combustion chamber along the annulus of the spout 46. The particles may be picked-up by the spout again and go through another cycle to form even larger particles or if their size exceeds the limit for fluidization they fall into the coal ash separator 18 and sink to the bottom of the vessel for removal. The temperature of the ash bed in the combustion chamber is controlled to achieve maximum ash agglomeration. By correlation of reactor configuration and the gas velocities, the solid circulation rate between the two chambers maintain the operating temperatures of the gasification chamber and the combustion chamber at such values that both gasification and ash agglomeration rates are optimum. The ash bed temperature can also be controlled by manipulation of two feed streams, i.e., steam rate to the air line and coal rate to the combustion chamber, in the event that the solid circulation rate cannot control the operating temperatures at the desired values owing to changes of operating conditions. The temperature of the combustion region in spout 46, may be detected by an optical device installed at the inlet of the air pipe 16. This temperature measurement may be made to serve as a monitor of the steam and coal feed rate by means well known in the art.

The annular section between the central tube 16 and the refractory wall of the vessel is filled with ash particles. Steam is introduced into this region at the bottom of the vessel through distributor plate 28 with a velocity high enough to strip the coal fines out of the ash bed. This velocity is lower than the minimum velocity of the air entering through line 16. Separation of ash from aerodynamic may be accomplished by semi-fluidizing the mixture or entraining char out of the bed by means of the upwardly flowing steam. It will be understood that other gases which do not react exothermically with the carbon may be used for this purpose. As the ash particles fall through the coal ash separator 18, they are cooled by the upwardly flowing steam or other gases. The cooled ash particles (preferably at a temperature of about 400° to 600°F) are then removed from the bottom of the vessel through the withdrawal line 30.

Solid particles in the bed 48 are my by the gases rising from the spout 46 and also by the gas entering around the United States from the inlet means in the inclined surface 20 and from the steam or other gases which have been used for stripping the ash. The high velocity jet or spout at the center of the combustion chamber and the low velocity gas in the annulus creates a high solid mixing in the gasification zone. The apparatus is best described as a spout-fluid bed combustor-gasifier. The apparatus and method as mentioned above in the Summary of the Invention offers many advantages over known apparatus and procedures. Especially advantageous is the solid particle circulation between combustion and gasifier sections with results in efficient heat transfer in the bed. The apparatus and method of operation are particularly suitable for coarse coal particles which require high heat and mass transfer rate.

The particle size of the coal is limited only by the limits of fluidization and ease of transportation through pipe lines. It may range from about 50 mesh up to one-fourth inch and above, with the larger size being quite suitable. The configuration of the interior of the apparatus is readily designed from existing knowledge of fluidizing gas velocity and kinetics of combustion, gasification and ash agglomeration. A high fluidizing gas velocity in the vessel is generally chosen so that the diameter of the vessel can be relatively small and the height of the gasification bed relatively high. Data on kinetics are readily obtained from the published literature and are used to determine the height of the fluidized bed required to provide for complete combustion, gasification and ash agglomeration.

The following Example provides representative dimensions and operating conditions for a one ton per hour coal gasification unit pursuant to the invention.

EXAMPLE

Equipment Sizing and Operating Conditions

Pressure: 15 atm
Coal: Illinois No. 6, dried, 1 ton/hr

| Equipment | Diameter (inch) Inner | Diameter (inch) Outer | Height (ft) Bed | Height (ft) Vessel | Superficial Velocity (ft/sec) | Temperature °F |
|---|---|---|---|---|---|---|
| Combustor | — | | 8.0 | 8.0 | — | — |
| Center Tube | 4.0 | 8.0 | 5.5 | | 35.0 | 600 |
| Annulus Sec. | 8.0 | 16.0 | 5.5 | | 1.2 | 600 |
| Top Section | 16.0 | | 1.5 | | 7.58 | 2100 |
| Gasifier | 24.0 | | 12.0 | 30.0 | 3.8 | 2000 |

The composition of the fuel gas generated from the combustor-gasifier by using Illinois No. 6 coal under the foregoing condition was 47.1% $N_2$, 17.0% CO, 10.0% $CO_2$, 11.9% $H_2$, 14.0% $H_2O$. The thermal efficiency of the unit is as high as 97%. Particulate loading in the fuel gas is lower than 1% of the ash fed with the coal when the self-agglomerating combustor-gasifier is coupled with an external cyclone. The apparatus is therefore particularly suitable for generating fuel gases for power generation.

We claim:

1. Apparatus for gasification of coal particles comprising a vertically disposed refractory lined, pressure vessel, outlet means in the upper portion thereof for removing gases, an upper section of said vessel defining a gasification chamber and a lower section of said vessel being of reduced diameter and forming a combustion chamber, a central tube for introduction of air extending into said pressure vessel through the bottom thereof and having an open upper end terminating at said combustion chamber, said tube and the lower portion of the inner refractory wall of said vessel forming an annulus, a perforated distributor plate extending across said annulus, means for introducing coal particles into the lower part of said gasification chamber, means for introducing coal particles into said combustion chamber at the open upper end of said central tube, means for introducing stripping steam below said perforated distributor plate, and means for removal of ash from the annulus above said perforated distributor plate.

2. The apparatus of claim 1 wherein the inner refractory wall of the vessel in the vicinity of the intersection of the combustion chamber and gasification chamber is inclined upwardly and outwardly.

3. The apparatus of claim 2 wherein means are provided to introduce a gasifying fluid through said inclined wall to fluidize the annulus above said inclined wall.

4. The apparatus of claim 1 wherein means are provided to introduce steam into said central tube for control of temperature.

5. The apparatus of claim 1 wherein the outer wall of the vessel is of cylindrical configuration and the refractory inner wall above the upper end of the central tube is of conical configuration.

6. A process for the gasification of coal particles comprising establishing a fluidized bed of said particles in a vertically disposed pressure vessel, introducing coal particles into said fluidized bed, forming a combustion zone of reduced cross-section below said fluidized bed, introducing oxygen-containing gas axially upward through a central tube into said combustion zone to form a spout extending into said fluidized bed, introducing coal particles into said oxygen-containing gas stream coming out of the open upper end of said central tube for complete combustion therein to supply heat for gasification of the particles in said fluidized bed and to form product gases removing agglomerated ash from the annulus around said central tube, withdrawing said product gases from the vessel above said fluidized bed, and maintaining said fluidized bed under a temperature in the range of about 1800° to 2200°F and a pressure within the range of about 10 to 30 atmospheres.

7. The process of claim 6 wherein said oxygen-containing gas is air and wherein steam is introduced into said air for temperature control.

8. The process of claim 6 wherein steam is introduced in an annular zone below said fluidized bed to fluidize the solids in an annular portion of said bed.

9. The process of claim 6 wherein the carbonaceous solids introduced into the oxygen-containing gas comprise carbon-containing fines elutriated from the fluidized bed and separated from the product gases.

10. The process of claim 7 wherein the air stream is introduced into the combustion zone at a velocity of about 15 to 80 feet per second and wherein the fluidized bed is of a height sufficient to prevent breakthrough of the spout caused by such stream.

11. The process of claim 6 wherein an ash bed is maintained in the annulus around said central tube and steam is introduced below said ash bed to strip carbon from said agglomerated ash and to cool said ash to facilitate its removal.

* * * * *